(12) United States Patent
Zhou (10) Patent No.: US 8,960,688 B2
(45) Date of Patent: Feb. 24, 2015

(54) POWER TOOL

(75) Inventor: Hongtao Zhou, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 786 days.

(21) Appl. No.: 13/180,684

(22) Filed: Jul. 12, 2011

(65) Prior Publication Data

US 2012/0139196 A1 Jun. 7, 2012

(30) Foreign Application Priority Data

Dec. 7, 2010 (CN) .......................... 2010 1 0601857

(51) Int. Cl.
| | |
|---|---|
| *B23B 31/02* | (2006.01) |
| *B24B 45/00* | (2006.01) |
| *B23D 61/00* | (2006.01) |
| *B23D 61/10* | (2006.01) |
| *B24B 23/02* | (2006.01) |
| *B27B 5/32* | (2006.01) |

(52) U.S. Cl.
CPC ............ *B24B 45/006* (2013.01); *B23D 61/006* (2013.01); *B23D 61/10* (2013.01); *B24B 23/022* (2013.01); *B27B 5/32* (2013.01)
USPC ............ 279/141; 83/698.11; 83/782; 30/330; 30/339; 451/356

(58) Field of Classification Search
USPC ............... 279/241; 83/698.11, 782, 597, 697; 30/330, 339, 331; 451/357, 359, 356
See application file for complete search history.

(56) References Cited

U.S. PATENT DOCUMENTS

| | | | | |
|---|---|---|---|---|
| 4,590,900 A | * | 5/1986 | Hayashi .................... | 123/90.67 |
| 5,157,873 A | * | 10/1992 | Rudolf et al. ............... | 451/342 |
| 5,601,483 A | * | 2/1997 | Rudolf et al. ............... | 451/359 |
| 6,569,001 B2 | * | 5/2003 | Rudolf et al. ............... | 451/344 |
| 6,910,694 B2 | * | 6/2005 | Hartmann et al. ........... | 279/141 |
| 7,344,435 B2 | * | 3/2008 | Pollak et al. ................ | 451/342 |
| 2007/0060030 A1 | * | 3/2007 | Pollak et al. ................ | 451/359 |
| 2009/0023371 A1 | * | 1/2009 | Blickle et al. ............... | 451/359 |
| 2010/0197208 A1 | * | 8/2010 | Blickle et al. ............... | 451/342 |

* cited by examiner

*Primary Examiner* — Andrea Wellington
*Assistant Examiner* — Chwen-Wei Su
(74) *Attorney, Agent, or Firm* — Greenberg Traurig, LLP (57) ABSTRACT

A power tool has a driving shaft driving a working element, a fastening piece fastening the working element to the driving shaft having a projecting shaft insertable into the driving shaft, a locking assembly locking the projecting shaft in the driving shaft having a locking member wherein the locking member has a locking position for locking the projecting shaft with the driving shaft and a loosening position for loosening the projecting shaft with the driving shaft. At the locking position, the fastening piece is pressed towards an end portion of the driving shaft by an elastic component. The locking assembly further includes a movable member arranged outside of the driving shaft, the movable member having a first portion and a second portion which can be directly or indirectly mated with the locking member wherein a radial distance of the first portion relative to a shaft center of the driving shaft is unequal to that of the second portion relative to the shaft center of the driving shaft.

14 Claims, 6 Drawing Sheets

POWER TOOL

RELATED APPLICATION DATA

This application claims the benefit of CN 201010601857.0, filed on Dec. 7, 2010, which application is incorporated herein by reference in its entirety.

BACKGROUND

Power tools having a quick clamping device are known in the art. An example of such a tool is found in U.S. Pat. No. 6,569,001 which is directed to an angular grinder equipped with a hollow mandrel shaft in which a clamping device movable between a clamped position and a released position along the axial direction of the shaft is mounted. The clamping device comprises a clamping flange which is provided with a threaded pin arranged in the middle thereof and is used for cooperating with an opposite flange on the end of the hollow mandrel shaft to clamp a working element therebetween. A thrust component mated with the threaded pin is further arranged in the hollow mandrel shaft. At the clamped position, the threaded pin is screwed into the thread of the trust component and maintained in the clamped position under the action of the spring force, and at the released position, the thrust component pushes the threaded pin so as to drive the clamping flange to overcome the spring force and disengage from the clamped surface of the working element. Because there is no frictional force therebetween when the clamping flange and the clamped working element rotates relative to each other, the threaded pin of the clamping flange can be manually screwed out of the thrust component without the aid of any accessory so that the working element can be replaced conveniently.

For this kind of clamping device, the working element can be substantially clamped to the output shaft of the hand tool without any auxiliary tool. However, this clamping device is only suitable for clamping a device to a rotatably driven working element. If the working element is to be driven by a vibration device, such that the working element sways forward and rearward along a longitudinal axis of the output shaft, the know clamping device can not ensure continued clamping of the working element against the forces resulting from the operation of such a vibration device.

SUMMARY

To cure at least the deficiencies above noted, the subject disclosure is directed to a power tool which can secure a working element to an output shaft in a simple and reliable manner without the use of an auxiliary tool such as a spanner, etc. and which can achieve a relatively stronger clamping force upon the working element. In this manner, even under impact conditions occurring as a result of the working element being driven by a vibration driver, the clamping force will be enough to ensure that the working element will remain clamped to the tool both reliably and firmly.

More particularly, the following describes a power tool, comprising: a driving shaft driving a working element; a fastening piece fastening the working element to the driving shaft and having a projecting shaft insertable into the driving shaft; and a locking assembly locking the projecting shaft in the driving shaft which includes a locking member having a locking position for locking the projecting shaft and a loosening position for loosening the projecting shaft. At the locking position, the fastening piece presses towards an end portion of the driving shaft by an elastic component.

The locking assembly may further comprise a movable member arranged outside of the driving shaft, the movable member having a first portion and a second portion, wherein a radial distance from the first portion to a shaft center of the driving shaft is unequal to that from the second portion to the shaft center of the driving shaft. When the first portion is directly or indirectly mated with the locking member the locking member will be at the locking position and when the second portion is directly or indirectly mated with the locking member the locking member will be at the loosening position.

The locking member may also be provided with an adaptation portion for directly cooperating with the first portion and the second portion.

The adaptation portion can be configured as a portion having an inclined plane.

The locking assembly may further comprise a middle member placed between the locking member and the movable member, wherein the middle member is selectively located on the first portion or the second portion of the movable member.

Further, in order to enhance the reliability of the locking action, a shaped-locking component may be arranged on the projecting shaft of the fastening piece and on the locking member for securing the shaft shaped-locking component at the locking position.

The projecting shaft of the fastening piece may also be provided with a toothed-part cooperating with a matching toothed-part on the locking member.

The locking member can move between the locking position and the loosening position with the moving direction thereof being substantially perpendicular to the projecting shaft.

The locking member may further comprise a movable device which cooperates with the elastic component such that the movable device moves in the axial direction of the driving shaft.

With such an arrangement of components, after the working element is clamped and starts to oscillate, the locking assembly for clamping the working element can sway along with the locking assembly. This prevents the generated sway from transferring to the movable device and the movable device can separate a distance relative to the movable member when the locking member is at the locking position.

A biasing element may further act on the locking member to bias the locking member towards a direction to overcome the thrust force generated by inserting the projecting shaft.

An end surface of the locking member may be provided with a boss having an inclined plane for cooperating with the biasing element to bias the locking member toward the center in the radial direction. This structure is arranged so that the locking member has an elastic pre-tightening force toward the center thereof. When the toothed-part of the locking member engages with that of the projecting shaft, it can generate a motional feeling or sound of "click" so as to enhance the operational feeling.

The locking member may be arranged in a cavity of the driving shaft and the movable member may be arranged outside of the driving shaft and be equipped with a connection piece thereon which extends through the driving shaft and which is able to abut against the locking member.

The movable member may be configured as a sliding sleeve surrounding the driving shaft and the middle member may be configured as a steel ball or a pin placed in a hole on the driving shaft.

The driving shaft can be driven in a vibrant manner relative to its longitudinal axis.

By introducing the above technical solutions, the subject power tool is able to quickly clamp the working element and is convenient and easy to use. Moreover, the device has a simple and compact structure and has a reduced construction cost. Furthermore, arranging the movable member outside of the driving shaft is advantageous to place a spanner in the lateral area of the working head of the tool so that the force arm of the spanner can be lengthened to reach the goal of effort-saving.

DETAILED DESCRIPTION

As shown in FIG. 1 to FIG. 4, the present invention will be described using an exemplary power tool 20 which drives a working element 40 in an oscillating manner. A power driving shaft 23 of the power tool 20 is supported by bearings 21 and 24 and sways back and forth about its axis Y with a small deflection angle and a high frequency under the action of vibration bracket 22. The driving shaft 23 is configured to be a portion of support shaft neck 231 on which the vibration bracket 22 is fitted via interference and press-fitting and a hollow mandrel portion 232 with which the support shaft neck 231 is fitted via interference and press-fitting, wherein the support shaft neck 231 and the hollow mandrel 232 enclose together to form a cavity 233. A shaft end 234 of the driving shaft 23 is provided with a protuberance for preventing the working element 40 from rotating. The driving shaft 23 is connected with a clamping device 10 for quickly clamping the working element 40 to the shaft end 234.

The clamping device 10 comprises a fastening piece 1 configured to have a flange portion 11 able to clamp the working element 40 and a projecting shaft 12 substantially perpendicular to the flange portion 11, wherein the projecting shaft 12 can be inserted into the cavity 233 and can be locked or loosened by a locking assembly. The locking assembly comprises a sliding sleeve 5, a locking block 6, and a steel ball 7 abutting against the locking block 6, wherein the sliding sleeve 5 surrounds the outside of the mandrel 232 and is provided with a hole 51 within which a pin 4 is mounted. The pin 4 passes through an elongate slot 235 defined along the axial direction on the mandrel 232 and acts against a spring 3 in the mandrel 232. The sliding sleeve 5 is further provided with a recess portion 52 which can mate with the steel ball 7 placed in a hole 236 on the mandrel 232. When the position of the recess portion 52 is corresponding to that of the steel ball 7, the steel ball 7 can fall within the recess portion 52 so as to vacate a place for the locking block 6 to move outward in the radial direction. At the same time, the locking block 6 can loosen the projecting shaft 12 of the fastening piece 1, so that the fastening piece 1 can be taken out of the mandrel 232 and the working element 40 can be removed. When the sliding sleeve 5 moves to a position where the recess portion 52 is staggered with the steel ball 7, the steel ball 7 is pressed out of the recess portion 52, and at the same time the locking block 6 presses the projecting shaft 12 toward the center by the steel ball 7 such that the fastening piece 1 is clamped in the mandrel 232 firmly. The recess portion 52 is provided with an inclined surface for the steel ball 7 to easy slide thereon. Shape-locking structures 61 and 121 are arranged in the positions where the sliding block 6 and the projecting shaft 12 can be engaged with each other. The shape-locking structures 61, 121 can have teeth, annular grooves, or the like to engage with each other In another embodiment, the pin 4 can also be configured as a protuberance or a flange directly formed on the sliding sleeve 5. The protuberance or flange can pass through the slot 235 on the mandrel 232 to extend into the cavity 233 and can be placed between the locking block 6 and the spring 3 so that it can transfer or block the axial force of the spring 3 acting on the locking block 6.

By the cooperation of the movable device 30 and the spring 3, the sliding sleeve 5 moves in the axial direction. The movable device 30 can comprise a cam spanner 31 for operation and a linkage shifting fork 32 acting on the sliding sleeve 5, wherein the cam spanner 31 and the shifting fork 32 can be pivotally arranged on the frame body of the tool 20 respectively. Under the action of the cam surface of the spanner 31, the shifting fork 32 rotates so that it can contact with the sliding sleeve 5 and drive the sliding sleeve 5 to move. A torsion spring 34 acts on the spanner 31 so that the spanner 31 has a tendency to be more closed. Therefore, the spanner 31 does not shake due to the high-frequency vibration of the tool during the tool's operation. There is a restoration spring 33 acting on the shifting fork 32.

The locking block 6 is restricted by a stop plate 9 in the axial direction. The stop plate 9 is fixed in the cavity 233 in a known way such as bolt and the like, and there is a biasing spring 8 acting on the other side corresponding to the stop plate 9. Thus, the locking block 6 can have a slight displacement in the axial direction, so that it is convenient for the toothed-part of the projecting shaft 12 to align and engage with that of the locking block 6, which reduces abrasion of the engaging parts and at the same time also provides a force-applying space for the spring 3 pushing the locking block 6 slightly upwards and causing the fastening piece 1 to elevate along therewith to further clamp the working element 1. The end surface of the locking block 6 has a boss 62 with an inclined plane, on which the biasing spring 8 can press against such that the locking block 6 tends to bias toward the center in the radial direction. When the projecting shaft 12 of the fastening piece 1 is inserted into the middle of the locking block 6, the operator can feel the engaging motion of the teeth so as to enhance the operation feeling, in addition, it also can generate a certain damping effect for the projecting shaft 12 so as to prevent the projecting shaft 12 from disengaging freely to fall down when it needs to pull out the projecting shaft 12.

Further, a collar 55 can be arranged on the portion where the sliding sleeve 5 is arranged with the hole 51, for blocking the pin 4 mounted in the hole 51 in the hole 51 and restricting the movement of the pin 4 in the radial direction.

The installing process of the working element of the power tool in accordance with this described embodiment will be particularly described below.

Figure 1:
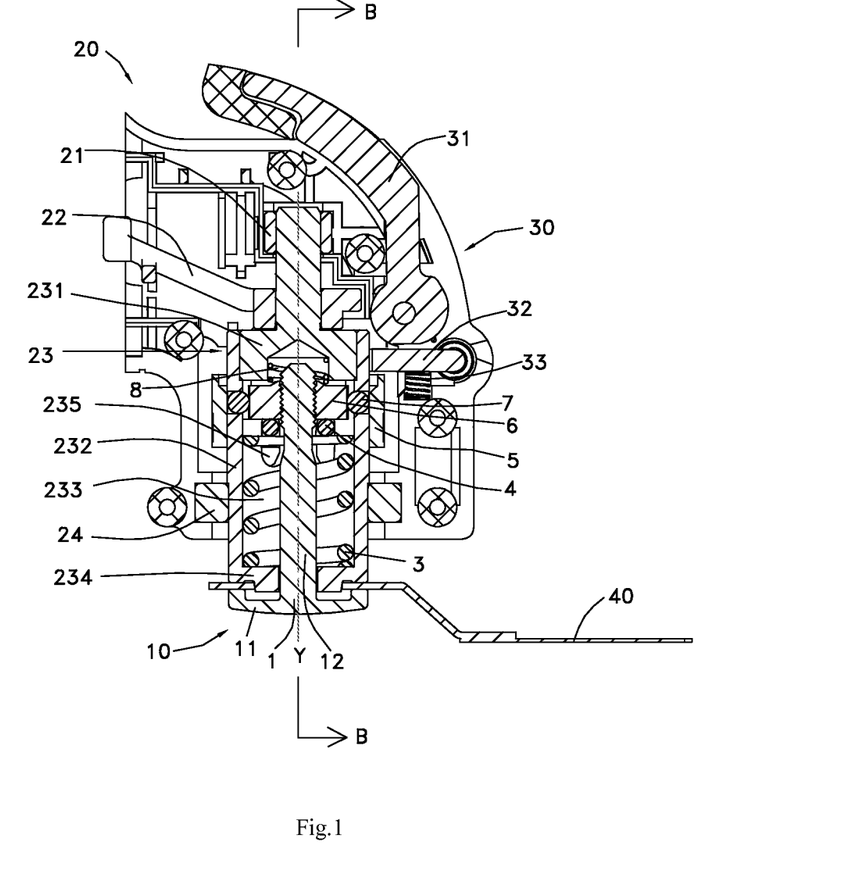
FIG. 1 is a sectional view of a working head area of an exemplary power tool constructed according to the description that follows, wherein the working element is fastened on a shaft end of a driving shaft by a fastening piece and a locking member is at a position where a projecting shaft of the fastening piece is locked.

Clamping the Working Element:

As shown in FIG. 1, the spanner 31 does not apply force on the shifting fork 32 any more, so that the shifting fork 32 moves upwardly to disengage from contact with the sliding sleeve 5 under the action of the restoration spring 33. The sliding sleeve 5 with the pin 4 is pushed upwardly by the spring 3, consequently, the steel ball 7 is pressed out of the recess portion 52 of the sliding sleeve 5 and pushes the locking block 6 to press towards the projecting shaft 12 such that the locking block 6 engages with the projecting shaft 12 sufficiently. The locking block 6 tends to be biased by the spring 3 to move upwardly, while the locking block 6 engages with the projecting shaft 12, thus, the projecting shaft 12 tends to be elevated upwardly so as to press the working element 40 on the driving shaft 23 tightly.

Figure 2:
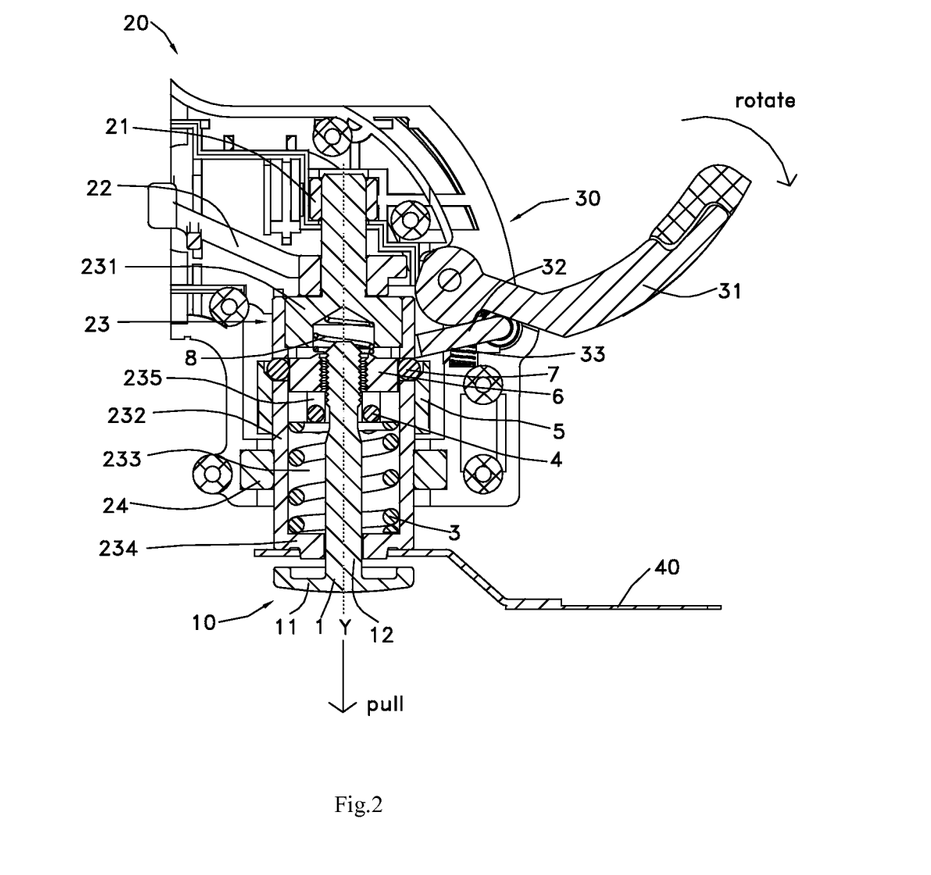
FIG. 2 is a sectional view of the working head area of the exemplary power tool wherein the working element can be released from the shaft end of the driving shaft by the fastening piece and the locking member is at a position where the projecting shaft of the fastening piece is loosened.
Figure 3:
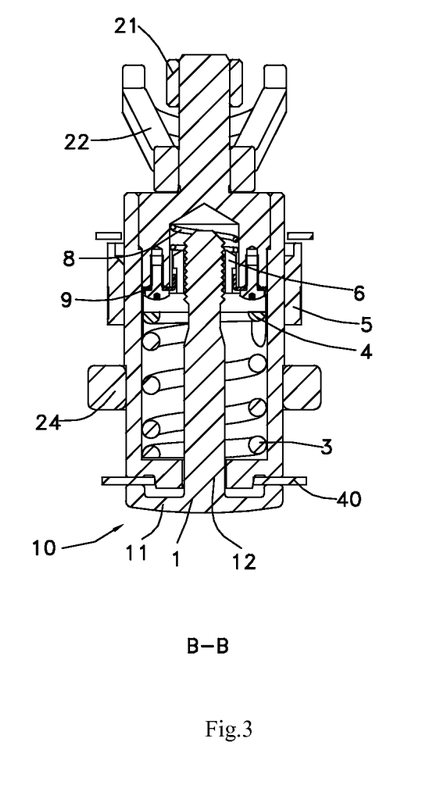
FIG. 3 is a view along cross section B-B of FIG. 1.
Figure 4:
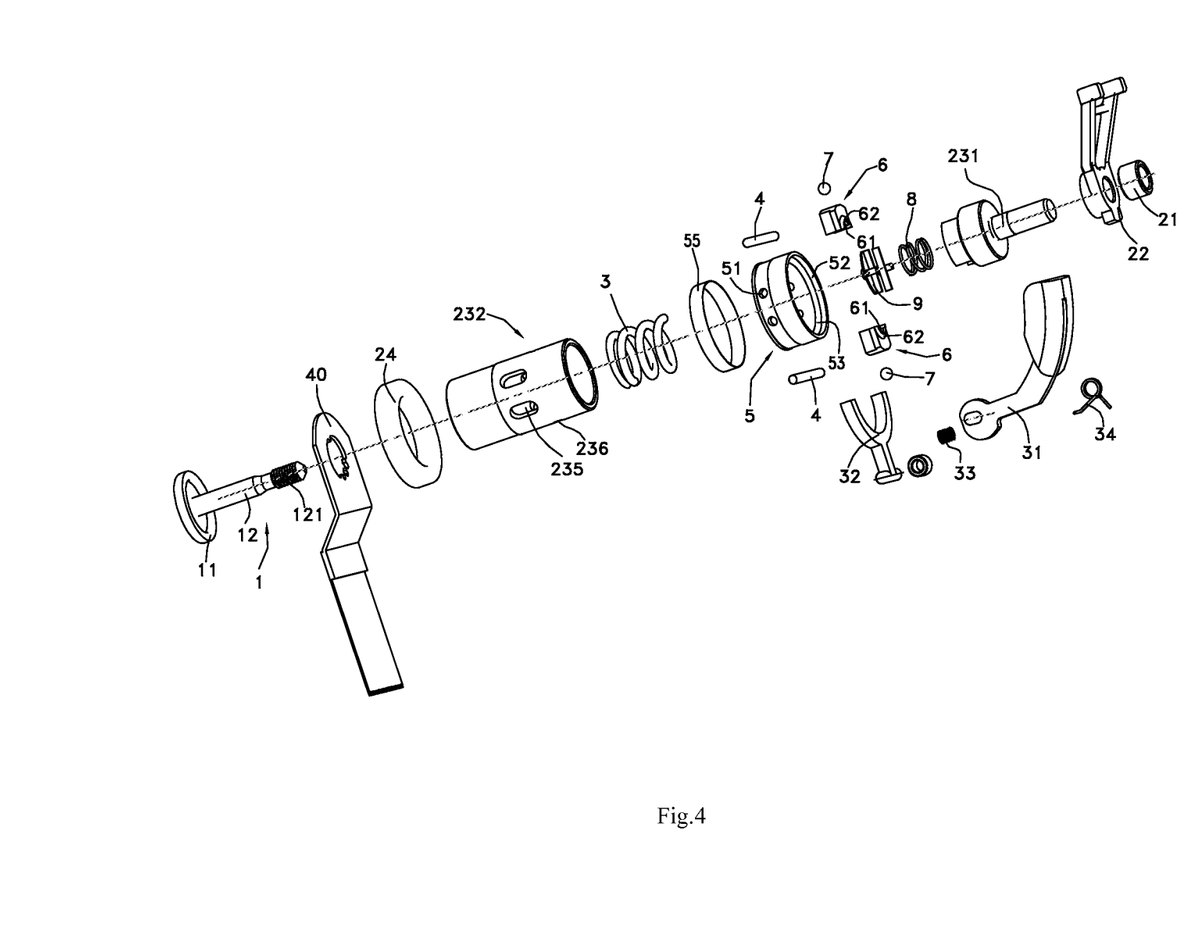
FIG. 4 is an exploded view of an assembly of the exemplary power tool.

Releasing the Working Component:

As shown in FIG. 2, to wrench the spanner 31 clockwise, the shifting yoke 32 is rotated counter-clockwise to press the sliding sleeve 5 downwardly, and accordingly the sliding sleeve 5 along with the pin 4 presses the spring 3 so that the force of the pin 4 acting on the locking block 6 is removed. Thus, the biasing spring 8 pushes the locking block 6 to move downwardly until the locking block 6 is blocked by the stop plate 9. The steel ball 7 is still restricted by the locking block 6 and the sliding sleeve 5 in the radial direction.

To continue wrenching the spanner 31, the sliding sleeve 5 continues moving downwardly to the position where the recess portion 52 corresponds to the steel ball 7, and the steel ball 7 can fall within the recess portion 52 so that the locking block 6 can have a certain displacement in the radial direction.

To pull the fastening piece 1 downwardly, under the action of the downward pulling force of the projecting shaft 12, the locking block 6 moves outward in the radial direction to loosen the projecting shaft 12, and the fastening piece 1 can be pulled out from the tool entirely.

Figure 5:
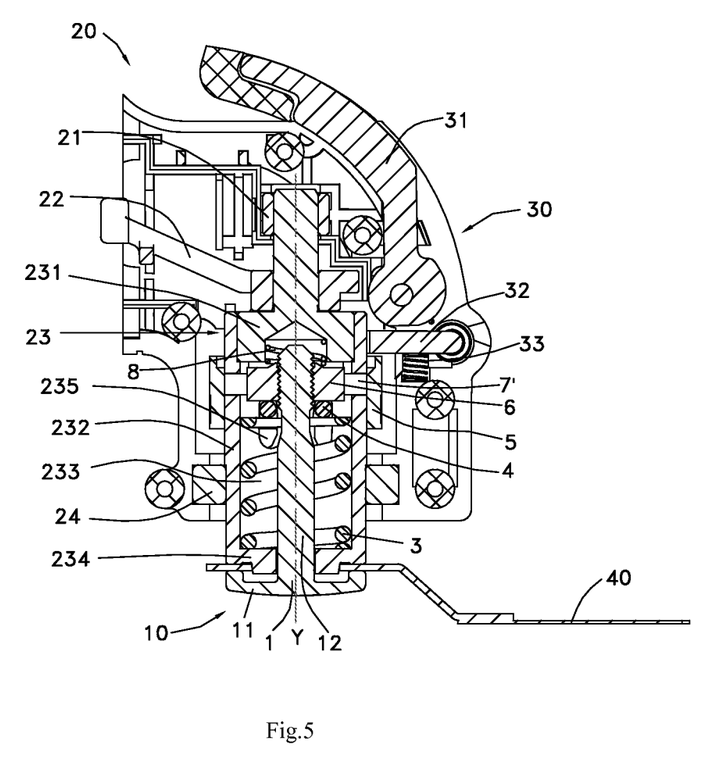
FIG. 5 is a sectional view of the working head area of the exemplary power tool wherein the locking assembly has a further embodiment.

The steel ball 7 of the locking assembly in the above-described embodiment can be replaced by a pin 7' in another embodiment. As shown in FIG. 5, the pin 7' passes through the hole 236 and is arranged therein, wherein one end thereof can abut against the locking block 6 and the other end thereof can be adapted into the recess portion 52 arranged on the sliding sleeve 5. The radial distance of the recess portion 52 relative to the shaft center of the driving shaft 23 is greater than that of the inner cylindrical surface 53 of the sliding sleeve 5 relative to the shaft center of the driving shaft 23. Thus, the pin 7' can slide between the recess portion 52 and the inner cylindrical surface 53 so as to drive the locking block 6 to move in the radial direction when the sliding sleeve 5 moves in the axial direction. The recess portion 52 in the present embodiment can be configured as a portion with a curved surface and also can be arranged as a portion with an inclined plane.

Figure 6:
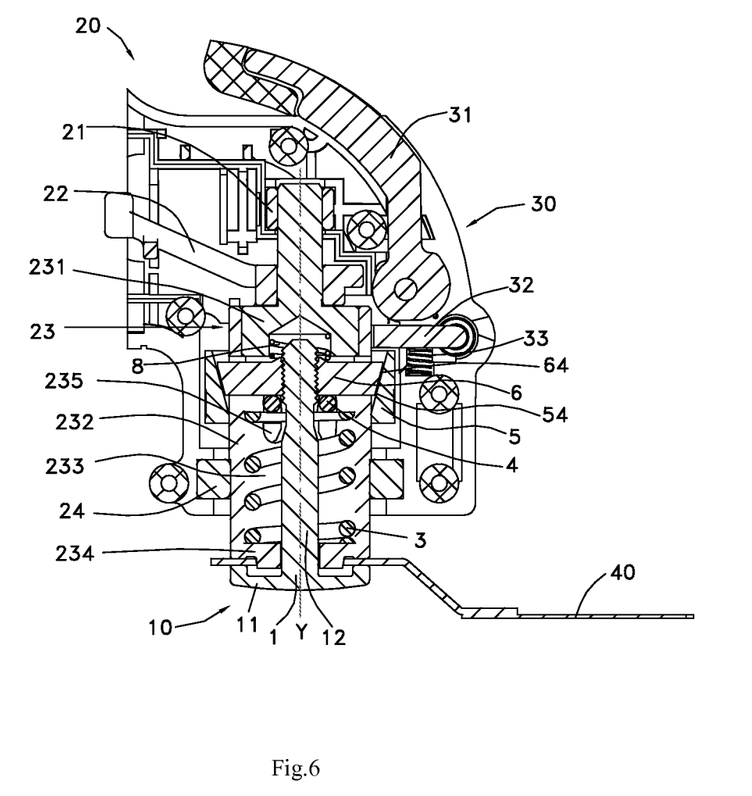
FIG. 6 is a sectional view of the working head area of the exemplary power tool wherein the locking assembly has a still further embodiment.

In another embodiment, the steel ball 7 or the pin 7' in the above embodiment can also be removed, while the locking block 6 and the sliding sleeve 5 can be mated directly by the inclined plane. As shown in FIG. 6, the locking block 6 partially passes through the hole 236, the inclined plane mated with the sliding sleeve 5 is arranged on the pass-through portion. When the sliding sleeve 5 moves in the axial direction, it can achieve that the locking block 6 moves in the radial direction so as to clamp or loosen the projecting shaft 12 of the fastening piece 1.

The power tool is not intended to be limited to the particular arrangements disclosed. Rather, those of ordinary skill in the art will appreciated that other elements and arrangements may be utilized to provide the advantages obtained by the embodiments illustrated and described by way of example only. Accordingly, obvious changes, replacements, and/or modifications to the shape and position of the components disclosed herein are to regarded as falling within the protection scope of the claims which follow.

What is claimed is:

1. A power tool, comprising:
   a driving shaft defining a longitudinal axis and driving a working element;
   a fastening piece fastening the working element to the driving shaft and having a projecting shaft insertable into the driving shaft;
   a locking assembly locking the projecting shaft in the driving shaft, the locking assembly comprising a radial locking member having a locking position for locking the projecting shaft in the driving shaft and a loosening position for loosening the projecting shaft in the driving shaft; and
   an elastic component for pressing the fastening piece towards an end portion of the driving shaft at the locking position;
   wherein the locking assembly further comprises a movable member movable along the longitudinal axis of the driving shaft, operatively coupled to the radial locking member, and arranged around the driving shaft, an inner surface of the movable member having a first portion and a second portion, wherein a radial distance of the first portion relative to a shaft center of the driving shaft is unequal to that of the second portion relative to the shaft center of the driving shaft such that, when the first portion is directly or indirectly mated with the locking member, the locking member is at the locking position and when the second portion is directly or indirectly mated with the locking member the locking member is at the loosening position.

2. The power tool according to claim 1, wherein the locking member further comprises an adaptation portion configured to directly mate with the first portion and the second portion of the movable member.

3. The power tool according to claim 2, wherein the adaptation portion is configured as a portion with an inclined plane.

4. The power tool according to claim 2, wherein the locking member moves in a direction substantially perpendicular to the longitudinal axis of the driving shaft when moving between the locking position and the loosening position.

5. The power tool according to claim 4, further comprising a pivotal lever comprising a cammed surface operably coupled to a linkage fork, which is operably coupled to the movable member such that pivotal movement of the lever causes the linkage fork and thus the movable member to move along the longitudinal axis of the driving shaft.

6. The power tool according to claim 5, wherein the cammed surface of the lever is separated from the movable member a distance when the locking member is in the locking position.

7. The power tool according to claim 4, wherein the locking member is arranged in a cavity of the driving shaft, and the movable member is provided with a connection piece passing through the driving shaft and extending into the cavity and abutting against the locking member.

8. The power tool according to claim 1, wherein the locking assembly further comprises a middle member arranged between the locking member and the movable member, wherein the middle member is selectively located on one of the first portion or the second portion of the movable member.

9. The power tool according to claim 8, wherein the movable member is configured as a sliding sleeve surrounding the driving shaft, and the middle member is configured as at least one of a steel ball or a pin placed in a hole on the driving shaft.

10. The power tool according to claim 1, wherein the outer circumferential surface of the projecting shaft comprises a shaped-locking component and a corresponding inner circumferential surface of the locking member comprises a complementary shaped-locking component for releasable fastening the projecting shaft within the locking member in the locking position.

11. The power tool according to claim 10, wherein the shaped-locking component of the projecting shaft of the fastening piece is a toothed surface and the complementary shaped-locking component of the locking member is also a toothed surface.

12. The power tool according to claim 1, comprising a biasing component acting on the locking member, the biasing component biasing the locking member inward towards the longitudinal axis of the driving shaft.

13. The power tool according to claim 12, wherein an end surface of the locking member is provided with a boss having an inclined surface, for cooperating with the biasing component to bias the locking member toward the the longitudinal axis of the driving shaft.

14. The power tool according to claim 1, wherein the driving shaft is driven in a vibratory manner relative to the longitudinal axis thereof.

* * * * *